US012679739B2

(12) United States Patent
Lee et al.

(10) Patent No.: US 12,679,739 B2
(45) Date of Patent: Jul. 14, 2026

(54) METHOD OF PRODUCING BOEHMITE NANOPARTICLES AND APPARATUS FOR PRODUCING THE SAME

(71) Applicant: SK Innovation Co., Ltd., Seoul (KR)

(72) Inventors: Seung Woo Lee, Daejeon (KR); Chang Q Lee, Daejeon (KR); Jae Suk Choi, Daejeon (KR); Hye Jin Park, Daejeon (KR); Young Eun Cheon, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 762 days.

(21) Appl. No.: 17/982,833

(22) Filed: Nov. 8, 2022

(65) Prior Publication Data

US 2023/0144299 A1      May 11, 2023

(30) Foreign Application Priority Data

Nov. 8, 2021      (KR) ........................ 10-2021-0152203

(51) Int. Cl.
*C01F 7/30* (2022.01)
*B82Y 30/00* (2011.01)
*B82Y 40/00* (2011.01)
*C01F 7/448* (2022.01)

(52) U.S. Cl.
CPC ............... *C01F 7/30* (2013.01); *C01F 7/448* (2013.01); *B82Y 30/00* (2013.01); *B82Y 40/00* (2013.01); *C01P 2004/04* (2013.01); *C01P 2004/12* (2013.01); *C01P 2004/54* (2013.01); *C01P 2004/64* (2013.01)

(58) Field of Classification Search
None
See application file for complete search history.

(56) References Cited

U.S. PATENT DOCUMENTS 4,534,957 A * 8/1985 Lectard ................... C01F 7/448
423/625
5,019,367 A 5/1991 Oguri et al.
6,123,907 A 9/2000 Yamasaki et al.
(Continued)

FOREIGN PATENT DOCUMENTS

CN 110512310 A 11/2019
EP 0387856 A1 9/1990
(Continued)

OTHER PUBLICATIONS

Machine Translation for RU-2555907 (Year: 2015).*
(Continued)

*Primary Examiner* — Michael Forrest
(74) *Attorney, Agent, or Firm* — The Webb Law Firm

(57) ABSTRACT

Provided are a method for producing boehmite nanoparticles and an apparatus for producing the same, and more particularly, a method for producing boehmite nanoparticles and an apparatus for producing the same, which allow continuous production of nano-sized boehmite nanoparticles in a uniform size. The method for producing boehmite nanoparticles includes (S1) supplying a mixture including an aluminum hydroxide and an organic acid to a reaction unit; and (S2) heating and pressurizing the mixture supplied to the reaction unit simultaneously and sequentially.

14 Claims, 2 Drawing Sheets

(56)                    References Cited

U.S. PATENT DOCUMENTS

| | | | | |
|---|---|---|---|---|
| 2008/0015299 A1* | 1/2008 | Takemura | ............... | C01F 7/448 |
| | | | | 423/625 |
| 2009/0104108 A1* | 4/2009 | Jun | ........................... | C01F 7/36 |
| | | | | 423/626 |
| 2010/0267881 A1* | 10/2010 | Tiefenbruck | ............ | C07F 5/069 |
| | | | | 977/773 |

FOREIGN PATENT DOCUMENTS

| | | | |
|---|---|---|---|
| JP | H10151339 | A | 6/1998 |
| JP | 2015110521 | A | 6/2015 |
| JP | 6080317 | B2 | 2/2017 |
| KR | 101235123 | B1 | 2/2013 |
| KR | 1020170112073 | A | 10/2017 |
| RU | 2555907 | C2 * | 7/2015 |

OTHER PUBLICATIONS

He et al., "Hydrothermal Preparation of Boehmite Nanorods by Selective Adsorption of Sulfate", Langmuir, 2008, pp. 8284-8289, vol. 24, No. 15.

* cited by examiner

METHOD OF PRODUCING BOEHMITE NANOPARTICLES AND APPARATUS FOR PRODUCING THE SAME

CROSS-REFERENCE TO RELATED APPLICATION

This application claims priority to Korean Patent Application No. 10-2021-0152203 filed Nov. 8, 2021, the disclosure of which is hereby incorporated by reference in its entirety.

BACKGROUND OF THE INVENTION

Field of the Invention

The following disclosure relates to a method for producing boehmite nanoparticles and an apparatus for producing the same, and more particularly, to a method for producing boehmite nanoparticles and an apparatus for producing the same, which allow continuous production of nano-sized boehmite nanoparticles in a uniform size.

Description of Related Art

Inorganic fine particles are being used in various applications such as ceramic materials, electronic materials, catalysts, pigments, and functional fillers. Inorganic fine particles may be produced by a synthesis method such as a gas phase method, a solid phase method, an air core method, a hydrolysis method, a sol-gel method, a thermal decomposition method, and a hydrothermal reaction method, but are practically industrially produced by a hydrothermal reaction method which has relatively high production efficiency and almost no agglomeration between fine particles.

Meanwhile, a boehmite particle which is one of the inorganic particles is represented by a chemical structural formula of AlO(OH) or $Al_2O_3 \cdot H_2O$, and generally, is a chemically stable alumina hydrate produced by a hydrothermal reaction treatment of an alumina hydrate ($Al(OH)_3$) under high temperature and high pressure. Boehmite is being used in various fields such as a reinforcing material, a flame retardant, a brightening material, a fireproof material, a thickener, a lubricant, a filling material, a catalyst carrier, a filler, a refractory material, a heat-resistant material, a raw material for an element/fluorescent material, an oil absorption material, and an absorbent material.

In general, the boehmite particles are produced by a hydrothermal reaction method from an alumina hydrate, as disclosed in Patent Document 1 (Korean Patent Laid-Open Publication No. 10-2017-0112073). Specifically, the boehmite particles are being produced by a batch production process by a batch reactor such as an autoclave. After a mixture including the alumina hydrate is supplied to the batch reactor, the production is performed by heating and pressurizing the inside of the reactor. However, the batch production process as such has much lower productivity than a continuous production process, and in order to change the physical properties of the inorganic fine particles to be produced, the whole process should be stopped.

In addition, since the synthesis is performed by the hydrothermal reaction under the conditions of high temperature and high pressure, the inside of the reactor should be heated to a high temperature and pressurized at every production. Thus, the amount of electric power consumed is very large as compared with the amount of boehmite particles produced. Besides, since the size of the boehmite particles produced is not very uniform, the quality of the particles is poor, and thus, an additional process should be further performed.

Thus, conventionally, a raw material was pressurized and then heated, thereby allowing continuous production of inorganic fine particles having a relatively uniform size, that is, boehmite particles, as disclosed in Patent Document 2 (Japanese Patent Registration Publication No. 6080317B2) entitled "Method for producing inorganic fine particles". However, the boehmite particles produced by the method for producing boehmite particles as such has an average particle diameter of a micro size or larger, which is a relatively large size, and since mutual agglomeration between particles occurs, a process line is clogged by the boehmite particles produced, so that frequent process interruption and repairs are needed.

In addition, as described above, the boehmite particles have an average particle diameter of a micro size which is a relatively large size, and thus, when applied to various fields of materials, have poor dispersibility to deteriorate the quality of a final product.

SUMMARY OF THE INVENTION

An embodiment of the present disclosure is directed to providing a method for producing boehmite nanoparticles and an apparatus for producing the same, which allow continuous production of boehmite nanoparticles of 100 nm or less in a uniform size.

Another embodiment of the present disclosure is directed to providing boehmite nanoparticles having a uniform size.

In one general aspect, a method for producing boehmite includes: (S1) supplying a mixture including an aluminum hydroxide and an organic acid to a reaction unit; and (S2) heating and pressurizing the mixture supplied to the reaction unit simultaneously and sequentially.

In the method for producing boehmite according to an exemplary embodiment of the present disclosure, (S2) may include (S2-1) heating the mixture supplied to the reaction unit; and (S2-2) pressurizing the heated mixture.

In the method for producing boehmite according to an exemplary embodiment of the present disclosure, a temperature to which the mixture is heated in (S2) may be 80 to 200° C.

In the method for producing boehmite according to an exemplary embodiment of the present disclosure, a pressure to which the mixture is pressurized in (S2) may be 5 to 15 bar.

In the method for producing boehmite according to an exemplary embodiment of the present disclosure, a liquid hour space velocity (LHSV) of the mixture may be 0.01 to 5 $h^{-1}$.

In the method for producing boehmite according to an exemplary embodiment of the present disclosure, in (S1), the organic acid may be a (C2-C20) organic acid.

In the method for producing boehmite according to an exemplary embodiment of the present disclosure, before (S1), (S0) reacting a raw material including an aluminum alkoxide and an organic acid to produce the mixture including the aluminum hydroxide and the organic acid may be further included.

In the method for producing boehmite according to an exemplary embodiment of the present disclosure, in (S0), water may be added to the raw material to react the raw material, and (S0-1) removing a reaction by-product including alcohol during the reaction of the raw material may be included.

In the method for producing boehmite according to an exemplary embodiment of the present disclosure, in (S0), the removing of a reaction by-product may be performed by distillation.

In the method for producing boehmite according to an exemplary embodiment of the present disclosure, in (S0), the aluminum alkoxide may be represented by the following Chemical Formula 1:

$$Al(O—R)_3 \qquad \text{[Chemical Formula 1]}$$

wherein R is (C1-C20) alkyl, (C2-C20) alkenyl, (C3-C20) cycloalkyl, (C6-C20) aryl, (C1-C20) alkylsilyl, (C7-C20) arylalkyl, or (C7-C20) alkylaryl.

In the method for producing boehmite according to an exemplary embodiment of the present disclosure, in (S0), the aluminum alkoxide may be aluminum iso-propoxide.

In the method for producing boehmite according to an exemplary embodiment of the present disclosure, in (S0), a mole ratio of the aluminum alkoxide:the organic acid of the raw material may be 1:0.001 to 1.

In the method for producing boehmite according to an exemplary embodiment of the present disclosure, in (S1), the aluminum hydroxide may be a gelled one.

In another general aspect, an apparatus for producing boehmite includes: a pretreatment unit in which a raw material including an aluminum alkoxide and an organic acid are reacted to produce a mixture including an aluminum hydroxide and the organic acid; and a reaction unit in which the mixture discharged from the pretreatment unit are heated and pressurized to produce boehmite particles.

In the apparatus for producing boehmite according to an exemplary embodiment of the present disclosure, the reaction unit may include a heating unit which is connected to the pretreatment unit and heats the mixture discharged from the pretreatment unit; and a pressurization unit which is connected to a rear end of the heating unit and pressurizes the heated mixture discharged from the heating unit.

In the apparatus for producing boehmite according to an exemplary embodiment of the present disclosure, the pretreatment unit may distill and separate the reaction by-product, in the reaction of the raw material.

In another general aspect, rod-shaped boehmite nanoparticles having an average short axis diameter of 1 to 10 nm and an average long axis length of 30 to 100 nm are provided.

The rod-shaped boehmite nanoparticles according to an exemplary embodiment of the present disclosure may be produced by a production method including: (S1) supplying a mixture including an aluminum hydroxide and an organic acid to a reaction unit; and (S2) heating and pressurizing the mixture supplied to the reaction unit simultaneously and sequentially.

The rod-shaped boehmite nanoparticles according to an exemplary embodiment of the present disclosure may be produced by a production method further including: before (S1), (S0) reacting a raw material including an aluminum alkoxide and an organic acid, and removing a reaction by-product including alcohol during the reaction of the raw material to produce the mixture including the aluminum hydroxide and the organic acid.

In still another general aspect, boehmite nanoparticles satisfying the following Relations 1 to 4 are provided:

$$50 \text{ nm} \leq D_{50} \leq 70 \text{ nm} \qquad \text{[Relation 1]}$$

$$0.70 \leq D_{20}/D_{50} \leq 0.98 \qquad \text{[Relation 2]}$$

$$1.02 \leq D_{70}/D_{50} \leq 1.3 \qquad \text{[Relation 3]}$$

$$D_{95} \leq 100 \text{ nm} \qquad \text{[Relation 4]}$$

wherein $D_{50}$ in Relation 1 is a long axis diameter corresponding to 50% in a long axis diameter cumulative distribution of the rod-shaped boehmite nanoparticles, $D_{20}$ and $D_{50}$ in Relation 2 are long axis diameters corresponding to 20% and 50%, respectively, in the long axis diameter cumulative distribution of the rod-shaped boehmite nanoparticles, $D_{70}$ and $D_{50}$ in Relation 3 are long axis diameters corresponding to 70% and 50%, respectively, in the long axis diameter cumulative distribution of the boehmite nanoparticles, and $D_{95}$ is a long axis diameter corresponding to 95% in the long axis diameter cumulative distribution of the boehmite nanoparticles.

In the boehmite nanoparticles according to an exemplary embodiment of the present disclosure, the boehmite nanoparticles may have an aspect ratio of 5 to 20.

Other features and aspects will be apparent from the following detailed description, the drawings, and the claims.

DETAILED DESCRIPTION OF MAIN ELEMENTS

Figure 1:
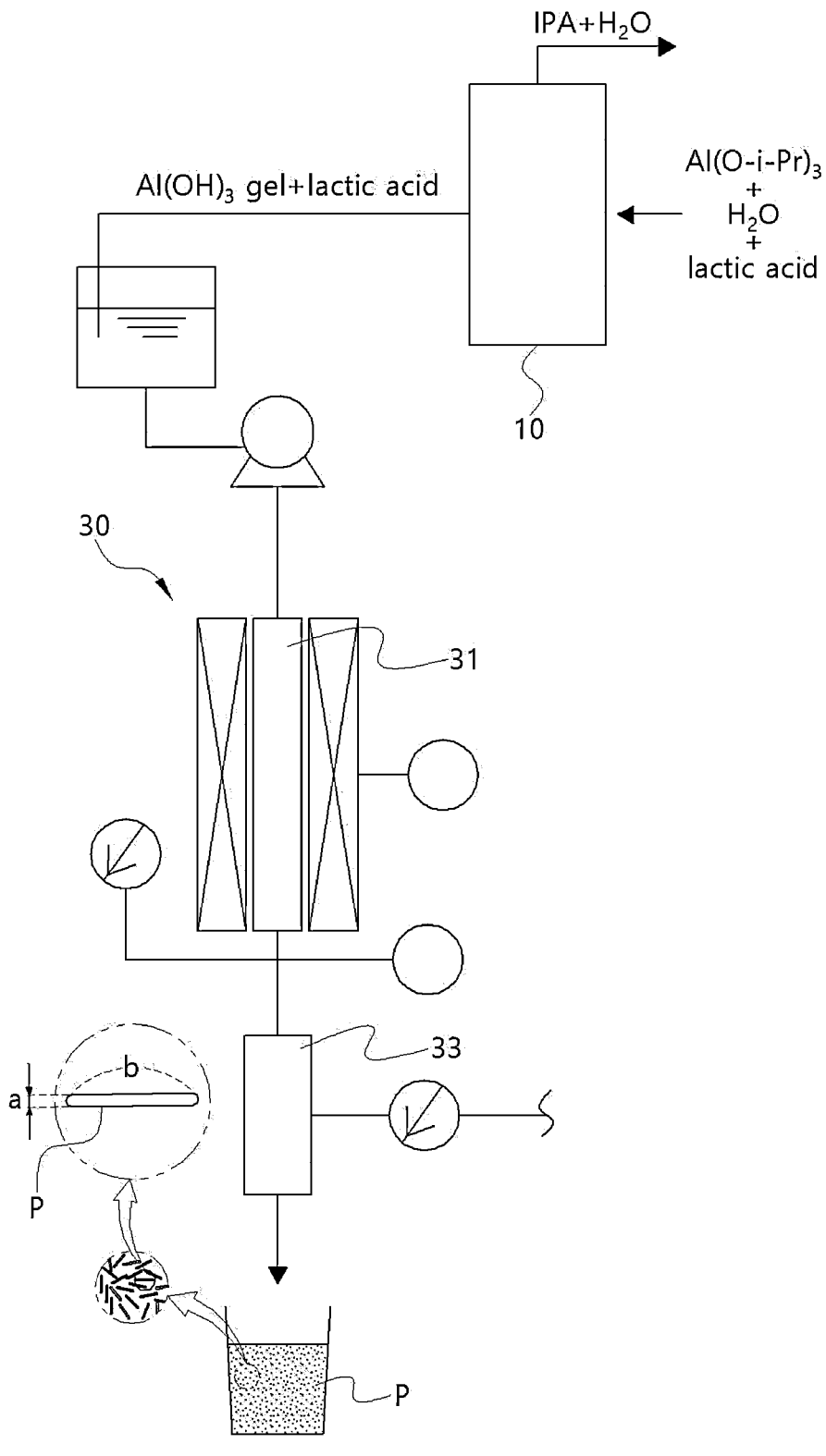
FIG. 1 is a schematic diagram of an apparatus for producing boehmite according to an exemplary embodiment of the present disclosure.

10: Pretreatment unit
30: Reaction unit
31: Heating unit
33: Pressurization unit
P: Boehmite (nano)particles
a: short axis diameter of boehmite particles
b: long axis length of boehmite particles

DESCRIPTION OF THE INVENTION

Technical terms and scientific terms used in the present specification have the general meaning understood by those skilled in the art to which the present disclosure pertains unless otherwise defined, and a description for the known function and configuration obscuring the gist of the present disclosure will be omitted in the following description and the accompanying drawings.

In addition, the singular form used in the present specification may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, the numerical range used in the present specification includes all values within the range including the lower limit and the upper limit, increments logically derived in a form and span in a defined range, all double limited values, and all possible combinations of the upper limit and the lower limit in the numerical range defined in different forms. Unless otherwise defined in the present specification, values which may be outside a numerical range due to experimental error or rounding of a value are also included in the defined numerical range.

The term "comprise" in the present specification is an open-ended description having a meaning equivalent to the term such as "is/are provided", "contain", "have", or "is/are characterized", and does not exclude elements, materials, or processes which are not further listed.

The term "rod-shaped" in the present specification refers to a shape extended to a certain length in one direction, and may refer to having an aspect ratio of more than 1 and less than 50.

The term "gelation" in the present specification may refer to a change to a solid three-dimensional network by a sol-gel process such as hydrolysis and condensation polymerization.

The term "boehmite" in the present specification is represented by a chemical structural formula of AlO(OH) or $Al_2O_3 \cdot H_2O$, and may refer to boehmite, pseudo-boehmite, or the like.

In general, the boehmite particles are being produced by a batch production process by a batch reactor such as an autoclave. After a mixture including the alumina hydrate is supplied to the batch reactor, the production is performed by heating and pressurizing the inside of the reactor. However, the batch production process as such has much lower productivity than a continuous production process, and in order to change the physical properties of the inorganic fine particles to be produced, the whole process should be stopped.

In addition, since the synthesis is performed by the hydrothermal reaction under the conditions of high temperature and high pressure, the inside of the reactor should be heated to a high temperature and pressurized at every production. Thus, the amount of electrical power consumed is very large as compared with the production amount in the production of boehmite particles, the size of the boehmite particles produced is not very uniform to lower the quality, and thus, an additional process should be further performed, resulting in very low process efficiency.

Thus, a technology to pressurize and then heat a raw material to allow continuous production of boehmite particles in a relatively uniform size has been suggested, but the boehmite particles produced by the method may have a relatively large size of an average particle diameter of a micro size or larger, and mutual agglomeration between particles occurs. Thus, there is a hassle of using a separate dispersing agent in the process of producing boehmite, and a process line is clogged by boehmite particles produced even with the use of the dispersing agent to cause frequent process interruption and repair. Thus, process efficiency is even lowered. In addition, since the boehmite particles as such have a relatively large size, their dispersibility is deteriorated when being applied to various fields of material, so that the quality of a final product may be deteriorated.

However, the method for producing boehmite according to the present disclosure includes (S1) supplying a mixture including an aluminum hydroxide and an organic acid to a reaction unit; and (S2) heating and pressurizing the mixture supplied to the reaction unit simultaneously or sequentially, and since the mixture including the aluminum hydroxide and the organic acid is reacted in the reaction unit, continuous production of boehmite particles in a very uniform nano size is allowed.

The method for producing boehmite as such may adjust the size of the boehmite particles produced by adjusting the content of the organic acid in the mixture. Thus, in the production of boehmite particles performed under relatively high temperature and high pressure conditions, the size of the boehmite particles produced by adjusting the amount of the organic acid added may be easily adjusted without interruption and restart of the process. Specifically, the boehmite particles produced by the method for producing boehmite as such may have a maximum length of 100 nm or less, or specifically, may have a maximum length of 90 nm, 80 nm, or 70 nm.

Specifically, (S1) is a step of supplying a mixture including an aluminum hydroxide and an organic acid to a reaction unit, and since the organic acid is further included unlike before, nano-sized boehmite particles may be produced. As described above, the size of the boehmite particles produced may be adjusted by the content of the organic acid in the mixture, and specifically, the more the organic acid is contained, the smaller the size of the boehmite particles produced is.

In (S1), the mixture includes an aluminum hydroxide $(Al(OH)_3)$ and an organic acid, and is an aqueous solution in which the aluminum hydroxide and the organic acid are dissolved. As the mixture in an aqueous solution is supplied to the reaction unit, it is hydrothermally synthesized to form boehmite particles represented by a chemical structural formula of AlO(OH) or $Al_2O_3 \cdot H_2O$. In particular, as described above, the boehmite nanoparticles produced by including the organic acid may be formed in a very small size of a nano size, and the particle size may be very uniform.

A mole ratio of aluminum hydroxide:organic acid in the mixture is not limited as long as nano-sized boehmite particles may be produced. Unlimitedly, the mole ratio of aluminum hydroxide:organic acid may be 1:0.001 to 1, specifically 1:0.01 to 1, and more specifically 1:0.05 to 0.5. Within the range, nano-sized uniform boehmite particles may be produced as compared with the amount of the organic acid added, and the size of the boehmite particles may be adjusted to a nano scale.

The aluminum hydroxide $(Al(OH)_3)$ is not limited as long as it is conventionally known, and preferably, is a gelled one by sol-gel processing. As an example, it may be a gelled one by hydrolysis of the aluminum alkoxide. The aluminum hydroxide as such has excellent reaction activity in the reaction unit, and allows formation of uniform nano-sized boehmite particles.

The organic acid may be a (C2-C20) organic acid, and specifically, may be any one or more selected from the group consisting of acetic acid, propionic acid, butyric acid, lactic acid, oxalic acid, malic acid, tartaric acid, and citric acid. More specifically, it may be acetic acid or lactic acid. The acetic acid and the lactic acid may be advantageous for uniformity and size adjustment of the boehmite particles, and may allow the hydrothermal synthesis reaction of the mixture including them to be performed more smoothly.

As the mixture including the organic acid described above is supplied to the reaction unit, preparation and continuous production of uniform nano-sized boehmite particles are allowed. The liquid hour space velocity (LHSV) of the mixture supplied into the reaction unit is not limited as long as the continuous production is allowed. Here, the liquid hour space velocity refers to a numerical value of the velocity at which the mixture is supplied to a reaction area in the reaction unit. However, when the liquid hour space velocity of the mixture supplied into the reaction unit may be $0.01 \text{ h}^{-1}$ or more, $0.05 \text{ h}^{-1}$ or more, $0.1 \text{ h}^{-1}$ or more and $5 \text{ h}^{-1}$ or less, $3 \text{ h}^{-1}$ or less, or $0.5 \text{ h}^{-1}$ or less, or between the numerical values, and may be, specifically $0.01$ to $5 \text{ h}^{-1}$, more specifically $0.01$ to $3 \text{ h}^{-1}$, and still more specifically 0.05 to 0.5 $h^{-1}$ or 0.1 to 0.5 $h^{-1}$. Within the range, the continuous production of the boehmite nanoparticles may be performed more smoothly.

After the mixture is supplied to the reaction unit through (S1) as such, the mixture is hydrothermally synthetically reacted through (S2) to produce the boehmite particles.

(S2) includes heating and pressurizing the mixture supplied to the reaction unit simultaneously or sequentially, and as the mixture is heated and pressurized simultaneously or sequentially, the boehmite particles may be produced by the hydrothermal synthesis reaction. Here, when the heating and the pressurizing are sequentially performed, it is not limited which of the heating or the pressurizing precedes. Specifically, the pressurizing may be performed after the heating, or the heating may be performed after the pressurizing.

The heating refers to raising the temperature of the mixture in the reaction unit by a heat source such as a heater, and may refer to a temperature rise of the mixture by a heat source without artificial pressurization. However, as the temperature of the mixture in the reaction unit is raised, the pressure in the reaction unit may be gradually raised even without artificial pressurization, and the natural pressure rise as such is not excluded from the heating.

The pressurization refers to a rise in pressure applied to the mixture by increasing internal pressure in the reaction unit through a pressurization source such as an air pump, and may refer to a rise in pressure applied to the mixture by a pressurization source without artificial heating. However, as the internal pressure in the reaction unit is raised, the temperature in the reaction unit may be gradually raised even without artificial heating, and the natural temperature rise as such is not excluded from the pressurization.

In addition, the pressurization refers to applying greater pressure than the pressure raised by the heating, when the pressurizing is performed after the heating.

In (S2), the temperature and the pressure to which the mixture is heated and pressurized are not limited as long as they are within the range of hydrothermally synthetically reacting the mixture supplied to the reaction unit. Specifically, in (S2), the temperature to which the mixture is heated may be 80° C. or higher, 100° C. or higher and 200° C. or lower, 180° C. or lower, or between the numerical values, and may be, specifically 80 to 200° C., and more specifically 100 to 180° C. In (S2), the pressure to which the mixture is pressurized may be 5 bar or more, 7 bar or more and 15 bar or less, 12 bar or less, or between the numerical values, and may be, specifically 5 to 15 bar, and more specifically 7 to 12 bar. Within the ranges of the temperature and the pressure, the hydrothermal synthesis reaction occurs smoothly as compared with the amount of energy added for heating and pressurizing, and nano-sized boehmite particles may be formed.

In addition, residence time of the mixture in the reaction unit in (S2) is not limited as long as the mixture supplied to the reaction unit is sufficiently hydrothermally synthetically reacted to produce the boehmite particles. As a specific example, in (S2), the residence time of the mixture in the reaction unit may be 2 to 20 hours, but is not limited thereto.

As described above, the heating and the pressurizing in (S2) may be performed simultaneously or sequentially. However, it may be advantageous for improving the uniformity of boehmite particles that the pressurization is performed after the heating.

Specifically, (S2) may include: (S2-1) heating the mixture supplied to the reaction unit; and (S2-2) pressurizing the heated mixture. That is, the mixture supplied to the reaction unit may be heated and then pressurized. The production method of heating and then pressurizing the mixture as such may produce the boehmite particles having very uniform shape and size as compared with the production method of pressurizing and then heating the mixture.

Specifically, the boehmite particles produced by including (S2-1) and (S2-2) may have a long axis length ratio between $D_{20}$ and $D_{50}$ ($D_{20}/D_{50}$) of 0.7 or more, 0.75 or more and 0.98 or less, 0.95 or less, or between the numerical values, specifically 0.70 to 0.98, and more specifically 0.75 to 0.95, in the long axis length corresponding to 20% ($D_{20}$) and 50% ($D_{50}$), respectively, in the long axis length cumulative distribution of the boehmite nanoparticles. In addition, the long axis length ratio between $D_{70}$ and $D_{50}$ ($D_{70}/D_{50}$) may be 1.02 or more, 1.05 or more and 1.3 or less, 1.25 or less, or between the numerical values, and specifically 1.02 to 1.3, and more specifically 1.05 to 1.25, in the long axis length corresponding to 70% ($D_{70}$) and 50% ($D_{50}$), respectively, in the long axis length cumulative distribution of the boehmite nanoparticles.

(S2-1) is a step of heating the mixture supplied to the reaction unit, and in (S2-1), the temperature of heating the mixture may be 80° C. or higher, 100° C. or higher and 200° C. or lower, 180° C. or lower, or between the numerical values, and specifically 80 to 200° C., and more specifically 100 to 180° C.

(S2-2) is a step of pressurizing the mixture heated in (S2-1), and in (S2-2), the pressure of pressurizing the mixture may be 5 bar or more, 7 bar or more and 15 bar or less, 12 bar or less or between the numerical values, and specifically 5 to 15 bar, and more specifically 7 to 12 bar. In (S2-2), the pressurizing refers to applying pressure higher than naturally raised pressure by the heating. In (S2-2), the mixture may be cooled simultaneously with the pressurizing.

The boehmite particles produced in (S2) may be cooled to be charged as a final product.

In an exemplary embodiment of the present disclosure, before (S1) described above, (S0) reacting a raw material including an aluminum alkoxide and an organic acid to produce a mixture including an aluminum hydroxide and an organic acid may be further included. The method for producing boehmite as such may supply a mixture in which an aluminum hydroxide and an organic acid are uniformly mixed to the reaction unit, so that the reaction activity of the mixture in (S2) may be better.

Specifically, the mixture produced from (S0) is an aqueous solution including a gelled aluminum hydroxide and an organic acid, and gelation of the aluminum hydroxide by the hydrolysis of the aluminum alkoxide proceeds and simultaneously the organic acid is uniformly mixed, so that the aluminum hydroxide and the organic acid may be homogeneously mixed as compared with a commercially available aqueous solution in which the aluminum hydroxide and the organic acid are dissolved. Thus, in (S0), a mixture in which an aluminum hydroxide and an organic acid are uniformly mixed may be supplied to the reaction unit, and the reaction in the supplied mixture occurs uniformly, so that boehmite particles having both excellent reaction activity, and more uniform size and shape may be produced.

In addition, in (S0), since the mixture in which the aluminum hydroxide and the organic acid are uniformly mixed may be supplied to the reaction unit, the content of the organic acid in the mixture may be precisely adjusted. Thus, the size of the boehmite particles having an average particle diameter of a nano size may be precisely adjusted into a nano scale.

The raw material in (S0) includes an aluminum alkoxide and an organic acid, as described above, and the content of the organic acid may be properly adjusted depending on the required size of the boehmite particles. The raw material may have a mole ratio of aluminum alkoxide:organic acid of 1:0.001 to 1, specifically 1:0.01 to 1, and more specifically 1:0.05 to 0.5. Within the range, the reaction by-product may be minimized to easily obtain a mixture in which an aluminum hydroxide and an organic acid are homogeneously mixed.

In (S0), the reaction of the raw material is a hydrolysis reaction, and may be performed by adding water to the raw material. The aluminum alkoxide reacts with water to form an aluminum hydroxide, and forms alcohol, and the like as a reaction by-product. Water sufficiently hydrolyzes the raw material, and may be sufficiently added so that a mixture in an aqueous solution phase may be obtained after the reaction. Specifically, it may be added to the raw material at a weight ratio of 10 to 30 times, specifically, 15 to 25 times.

In (S0), the raw material may be heated for the hydrolysis reaction of the raw material. The temperature to which the raw material is heated is not limited as long as the aluminum alkoxide may be hydrolyzed at the temperature but the temperature is lower than the boiling point of the raw material. Specifically, the temperature may be 80 to 150° C.

The aluminum alkoxide included in the raw material may be represented by the following Chemical Formula 1:

$$Al(O—R)_3 \qquad \text{[Chemical Formula 1]}$$

wherein R is (C1-C20) alkyl, (C2-C20) alkenyl, (C3-C20) cycloalkyl, (C6-C20) aryl, (C1-C20) alkylsilyl, (C7-C20) arylalkyl, or (C7-C20) alkylaryl.

Specifically, it may be any one or more selected from the group consisting of aluminum methoxide, aluminum ethoxide, aluminum n-propoxide, aluminum iso-propoxide, aluminum n-butoxide, and aluminum t-butoxide. As an example, the aluminum alkoxide may be aluminum iso-propoxide. Aluminum iso-propoxide has excellent reactivity with water, and may produce an aluminum hydroxide (Al(OH)$_3$) without other catalysts and reactants.

The organic acid may be an organic acid contained in the mixture of (S1).

As described above, in (S0), water may be added to the raw material to react the raw material, and alcohol and the like may be formed as a reaction by-product. Thus, (S0) may include a step of removing a reaction by-product including alcohol during the reaction of the raw material.

The reaction by-product may include not only alcohol formed by the hydrolysis reaction of an aluminum alkoxide, but also unreacted water which is not reacted with the aluminum alkoxide.

In (S0), the removal of the reaction by-product is not limited as long as it is a method capable of removing alcohol and water. Specifically, in (S0), the removal of the reaction by-product may be performed by distillation using a boiling point. Since the method of removing a reaction by-product by distillation may produce a high-purity mixture from which alcohol and water have been removed, it is more advantageous for the reaction of the mixture in (S2), and high-purity boehmite particles may be produced.

The distillation may be performed after the hydrolysis reaction of the raw material described above, but instead, may be performed simultaneously with the hydrolysis reaction of the raw material. A distillation temperature is preferably higher than the boiling point of alcohol and lower than the boiling point of an organic acid, and may be the same as the hydrolysis reaction temperature conditions of the raw material described above. As an example, it may be 100° C. to 130° C., but is not limited thereto.

The following FIG. 1 illustrates an apparatus for producing boehmite according to an exemplary embodiment of the present disclosure.

Hereinafter, referring to FIG. 1, the apparatus for producing boehmite according to the preferred exemplary embodiment of the present disclosure will be described in detail, but is not limited thereto.

Referring to FIG. 1, the apparatus for producing boehmite according to the present disclosure includes: a pretreatment unit 10 in which a raw material including an aluminum alkoxide and an organic acid are reacted to produce a mixture including an aluminum hydroxide and the organic acid; and a reaction unit 30 in which the mixture discharged from the pretreatment unit 10 are heated and pressurized to continuously produce boehmite particles. The apparatus for producing boehmite as such may include the pretreatment unit 10 to supply the mixture including an aluminum hydroxide having excellent reaction activity to the reaction unit 30. Thus, the productivity may be excellent when the boehmite particles are produced by the apparatus for producing boehmite.

Specifically, the pretreatment unit 10 may perform gelation of the aluminum hydroxide by the hydrolysis of the aluminum alkoxide, and simultaneously, may uniformly mix the supplied organic acid with the aluminum hydroxide. That is, the mixture produced by the pretreatment unit 10 is an aqueous solution including the gelled aluminum hydroxide and the organic acid, and the aluminum hydroxide and the organic acid may be homogeneously mixed as compared with a commercially available aqueous solution in which the aluminum hydroxide and the organic acid are dissolved. Thus, the pretreatment unit 10 may supply a mixture in which the aluminum hydroxide and the organic acid are homogeneously mixed to the reaction unit. In the reaction unit 30 to which the mixture is supplied by the pretreatment unit 10, the reaction in the supplied mixture uniformly occurs, so that the reaction activity is excellent and boehmite particles having more uniform size and shape may be produced.

In the pretreatment unit 10, a raw material including the aluminum alkoxide and the organic acid is reacted to produce a mixture including the aluminum hydroxide and the organic acid, and the pretreatment unit is not limited as long as it forms a reaction space in which the raw material may react. As described above, the aluminum alkoxide may react with water to be hydrolyzed to form the aluminum hydroxide. That is, the pretreatment unit 10 forms a reaction space in which the raw material including the aluminum alkoxide and the organic acid and water are hydrolytically reacted. The pretreatment unit may supply each of the raw material and water into the reaction space, or supply the raw material and the water after mixing them.

In addition, the pretreatment unit 10 may be a conventional reactor having a heating function for heating an aqueous solution in which the raw material and water are mixed, so that the hydrolysis reaction of the aluminum alkoxide occurs smoothly. Here, the temperature of heating the aqueous solution in which the raw material and water are mixed may be adjusted to distill and separate a reaction by-product produced in the reaction of the raw material.

In the pretreatment unit 10, (S0) of the method for producing boehmite described above may be performed.

The reaction unit 30 is positioned at a rear end of the pretreatment unit 10, and heats and pressurizes the mixture supplied by the pretreatment unit 10 to produce boehmite particles. The reaction unit is not limited as long as the mixture is heated and pressurized, but as a specific example, the reaction unit 30 may include a continuous hydrothermal reactor. The continuous hydrothermal reactor may heat and pressurize the mixture supplied from the pretreatment unit 10 to continuously produce boehmite particles. Specifically, the reaction unit 30 as such may perform (S1) and (S2) of the method for producing boehmite described above.

The reaction unit 30 may further have a line type stirrer, a spiral type stirrer, or the like in the reaction space in which the supplied mixture reacts, or have beads for stirring for filling the reaction space, so that the reaction may occur more uniformly or smoothly. Otherwise, it is not limited as long as it has a higher melting point than the synthetic reaction temperature at which the bead mixture filled in the inside of the reaction space are granulated. As an example, it may be glass beads. In the reaction unit further including a stirrer or glass beads as such, the granulation reaction of the mixture may occur more uniformly and smoothly, and the agglomeration between particles may be further prevented, so that boehmite particles having a more uniform size may be produced.

As illustrated in the drawing, the reaction unit 30 may include a heating unit 31 which is connected to the pretreatment unit 10 and heats the mixture discharged from the pretreatment unit and a pressurization unit 33 which is connected to the rear end of the heating unit 31 and pressurizes the mixture discharged from the heating unit 31. The reaction unit 30 as such may heat and then pressurize the mixture, thereby producing boehmite particles having a more uniform size. In the reaction unit provided with the heating unit 31 and the pressurization unit 33, respectively, (S2-1) and (S2-2) of the method for producing boehmite described above may be sequentially performed.

The heating unit 31 may perform (S2-1) described above, and is not limited as long as it is a continuous heater or reactor which may heat the mixture. As an example, it may be a continuous hydrothermal reactor, as illustrated in the drawing.

The pressurization unit 33 may perform (S2-2) described above, and is not limited as long as it is provided with a pressurizer for pressurizing the mixture. The pressurization unit may pressurize and also cool the mixture heated in the heating unit, and may finally discharge nano-sized boehmite particles.

Hereinafter, referring to FIG. 1, the method for producing boehmite by the apparatus for producing boehmite according to an exemplary embodiment of the present disclosure will be described in detail.

First, an aqueous solution in which water is added at a weight ratio of 10 to 30 times to a raw material having a weight ratio of aluminum alkoxide:organic acid of 3 to 10:1 may be added to the pretreatment unit 10. The internal temperature of the pretreatment unit 10 may be heated to 80 to 200° C. Here, the aluminum alkoxide and water are reacted to form a mixture in which an aluminum hydroxide and an organic acid are mixed as a product, and alcohol and unreacted water as a reaction by-product. Alcohol and unreacted water are distilled by the internal temperature of the pretreatment unit 10 to be separated and removed from the product, in the reaction of aluminum alkoxide and water. A product from which alcohol and a part of unreacted water are removed, that is, a mixture in which an aluminum hydroxide and an organic acid are mixed, that is, an aqueous solution in which a gelled aluminum hydroxide and an organic acid are mixed may be obtained from the raw material by the pretreatment unit 10.

The mixture obtained from the pretreatment unit 10 may be continuously supplied to the reaction unit 30 via a buffer tank, as described in the drawing.

The mixture supplied to the reaction unit 30 is heated to a temperature of 80 to 200° C., specifically 100 to 180° C. by the heating unit 31 of the reaction unit 30, and then transported to the pressurization unit 33 connected to the rear end of the heating unit 31 and pressurized to a pressure of 5 to 15 bar. Thus, the aluminum hydroxide in the mixture may be hydrothermally synthetically reacted to produce particulate boehmite particles.

The produced particles are very small and uniform in a nano size, and the size may be adjusted by the content ratio of the organic acid in the raw material added to the pretreatment unit. Specifically, as the content ratio of the organic acid is higher, boehmite particles in a smaller size may be produced.

The rod-shaped boehmite nanoparticles of the present disclosure may have an average short axis diameter (a) of 1 nm or more, 2 nm or more, 3 nm or more and 10 nm or less, 9 nm or less, 8 nm or less, or between the numerical values, and may be specifically 1 to 10 nm, more specifically 2 to 9 nm, and still more specifically 3 to 8 nm.

The rod-shaped boehmite nanoparticles of the present disclosure may have an average long axis length (b) of 30 nm or more, 35 nm or more, 40 nm or more and 100 nm or less, 90 nm or less, 80 nm or less, or between the numerical values, and specifically 30 to 100 nm, more specifically 35 to 90 nm, and more specifically 40 to 80 nm. As the rod-shaped boehmite nanoparticles satisfy the size range, they are more advantageous for continuous production and have very high dispersibility.

The average short axis diameter (a) and the average long axis length (b) of the rod-shaped boehmite nanoparticles, as described above, are averages of values measured by arbitrarily selecting 100 particles in a transmission electron microscopic (TEM, JEOL Ltd, JEM-2100F) image.

According to an exemplary embodiment of the present disclosure, the rod-shaped boehmite nanoparticles produced according to the production method of the exemplary embodiment described above may be provided. If there is the same term as described above among the following terms, the same description may be applied thereto. According to an exemplary embodiment, rod-shaped boehmite nanoparticles produced by a production method including: (S1) supplying a mixture including an aluminum hydroxide and an organic acid to a reaction unit; and (S2) heating and pressurizing the mixture supplied to the reaction unit simultaneously and sequentially may be provided.

When the rod-shaped boehmite nanoparticles are provided by the production method including (S1) and (S2) as in the above exemplary embodiment, boehmite nanoparticles having a very small size of a nano size and a very uniform particle size may be obtained.

In the specific exemplary embodiment of the present disclosure, rod-shaped boehmite nanoparticles produced by the production method further including (S0) reacting a raw material including an aluminum alkoxide and an organic acid to produce a mixture including an aluminum hydroxide and an organic acid, before (S1), described as being optional, may be provided. The method for producing boehmite further including (S0) may supply a mixture in which an aluminum hydroxide and an organic acid are uniformly mixed to the reaction unit, so that the reaction activity of the mixture in subsequent (S2) may be better.

Specifically, the mixture produced from (S0) is an aqueous solution including a gelled aluminum hydroxide and an organic acid, and gelation of the aluminum hydroxide by the hydrolysis of the aluminum alkoxide proceeds and simultaneously the organic acid is uniformly mixed, so that the aluminum hydroxide and the organic acid may be homogeneously mixed as compared with a commercially available aqueous solution in which the aluminum hydroxide and the organic acid are dissolved. Thus, in (S0), a mixture in which an aluminum hydroxide and an organic acid are uniformly mixed may be supplied to the reaction unit, and the reaction in the supplied mixture occurs uniformly, so that boehmite particles having both excellent reaction activity, and more uniform size and shape may be produced.

In addition, in (S0), since the mixture in which the aluminum hydroxide and the organic acid are uniformly mixed may be supplied to the reaction unit, as described above, the content of the organic acid in the mixture may be precisely adjusted. Thus, the size of the boehmite particles having an average particle diameter of a nano size may be precisely adjusted into a nano scale.

In (S0), the reaction of the raw material is a hydrolysis reaction, and may be performed by adding water to the raw material. The aluminum alkoxide reacts with water to form an aluminum hydroxide, and forms alcohol, and the like as a reaction by-product. Water sufficiently hydrolyzes the raw material, and may be sufficiently added so that a mixture in an aqueous solution phase may be obtained after the reaction. Specifically, it may be added to the raw material at a weight ratio of 10 to 30 times, specifically, 15 to 25 times.

As described above, in (S0), water may be added to the raw material to react the raw material, and alcohol and the like may be formed as a reaction by-product. Thus, in (S0), a reaction by-product including alcohol may be removed during the reaction of the raw material. The reaction by-product may include not only alcohol formed by the hydrolysis reaction of an aluminum alkoxide, but also unreacted water which is not reacted with the aluminum alkoxide.

The removal of the reaction by-product is not limited as long as it is a method capable of removing alcohol and water. Specifically, in (S0), the removal of the reaction by-product may be performed by distillation using a boiling point. Since the method of removing a reaction by-product by distillation may produce a high-purity mixture from which alcohol and water have been removed, it is more advantageous for the reaction of the mixture in (S2), and high-purity boehmite particles may be produced.

In an exemplary embodiment of the present disclosure, the rod-shaped boehmite nanoparticles of the present disclosure may satisfy the following Relations 1 to 4:

$$50 \ nm \leq D_{50} \leq 70 \ nm \qquad \text{[Relation 1]}$$

$$0.70 \leq D_{20}/D_{50} \leq 0.98 \qquad \text{[Relation 2]}$$

$$1.02 \leq D_{70}/D_{50} \leq 1.3 \qquad \text{[Relation 3]}$$

$$D_{95} \leq 100 \ nm \qquad \text{[Relation 4]}$$

wherein $D_{50}$ in Relation 1 is a long axis diameter corresponding to 50% in a long axis diameter cumulative distribution of the rod-shaped boehmite nanoparticles, $D_{20}$ and $D_{50}$ in Relation 2 are long axis diameters corresponding to 20% and 50%, respectively, in the long axis diameter cumulative distribution of the rod-shaped boehmite nanoparticles, $D_{70}$ and $D_{50}$ in Relation 3 are long axis diameters corresponding to 70% and 50%, respectively, in the long axis diameter cumulative distribution of the rod-shaped boehmite nanoparticles, and $D_{95}$ is a long axis diameter corresponding to 95% in the long axis diameter cumulative distribution of the boehmite nanoparticles.

The boehmite nanoparticles satisfying Relations 1 to 4 described above have a more uniform particle size distribution. That is, they have a very uniform nano size to have high dispersibility, so that they are very likely to be used as a high-quality additive.

The long axis diameter cumulative distribution of the rod-shaped boehmite nanoparticles is a cumulative distribution of the long axis diameter measured by arbitrarily selecting 100 particles in a transmission electron microscopic (TEM, JEOL Ltd, JEM-2100F) image.

According to a specific exemplary embodiment as one means which may provide rod-shaped boehmite nanoparticles satisfying Relations 1 to 4 described above, a production method including (S2-1) heating the mixture supplied to the reaction unit; and (S2-2) pressurizing the heated mixture as (S2) described above may be mentioned, but the present disclosure is not limited thereto. Boehmite particles having more uniform shape and size as compared with the production method of pressurizing and then heating the mixture as in the specific exemplary embodiment may be produced.

In a specific exemplary embodiment of the present disclosure, the rod-shaped boehmite nanoparticles optionally have a specific aspect ratio range, and may provide more uniform dispersibility, but are not limited thereto. In the aspect ratio (b/a) represented as the short axis diameter (a) and the long axis length (b) of the boehmite nanoparticles in the exemplary embodiment, the aspect ratio (b/a) may be 5 or more, 7 or more and 20 or less, 13 or less, or between the numerical values, and may be specifically 5 to 20, and more specifically 7 to 13. Within the range, the particles have excellent dispersibility, are more advantageous for continuous production, and may be used in more various fields.

Example 1

Boehmite nanoparticles were produced by the apparatus for producing boehmite illustrated in FIG. 1.

An aqueous solution in which 800 ml of water, 34 g of aluminum iso-propoxide, $Al(O\text{-}iso\text{-}Pr)_3$, and 5 g of lactic acid were mixed was added to a pretreatment unit 10. At this time, the internal temperature of the pretreatment unit was maintained at 120° C., and produced isopropyl alcohol (IPA) was removed and simultaneously, a part of unreacted water was removed. 677 g of a mixture of pH 4 was obtained.

The produced mixture was continuously supplied to the reaction unit 30 via a buffer tank. LHSV of the mixture was 0.13 h⁻.

The mixture supplied to the reaction unit 30 was heated to a temperature of 150° C. by a heating unit 31 of the reaction unit, and then transported to a pressurization unit 33 connected to the rear end of the heating unit 31 and pressurized to a pressure of 10 bar.

The production of boehmite nanoparticles as such was continuously performed for 30 hours.

Figure 2:
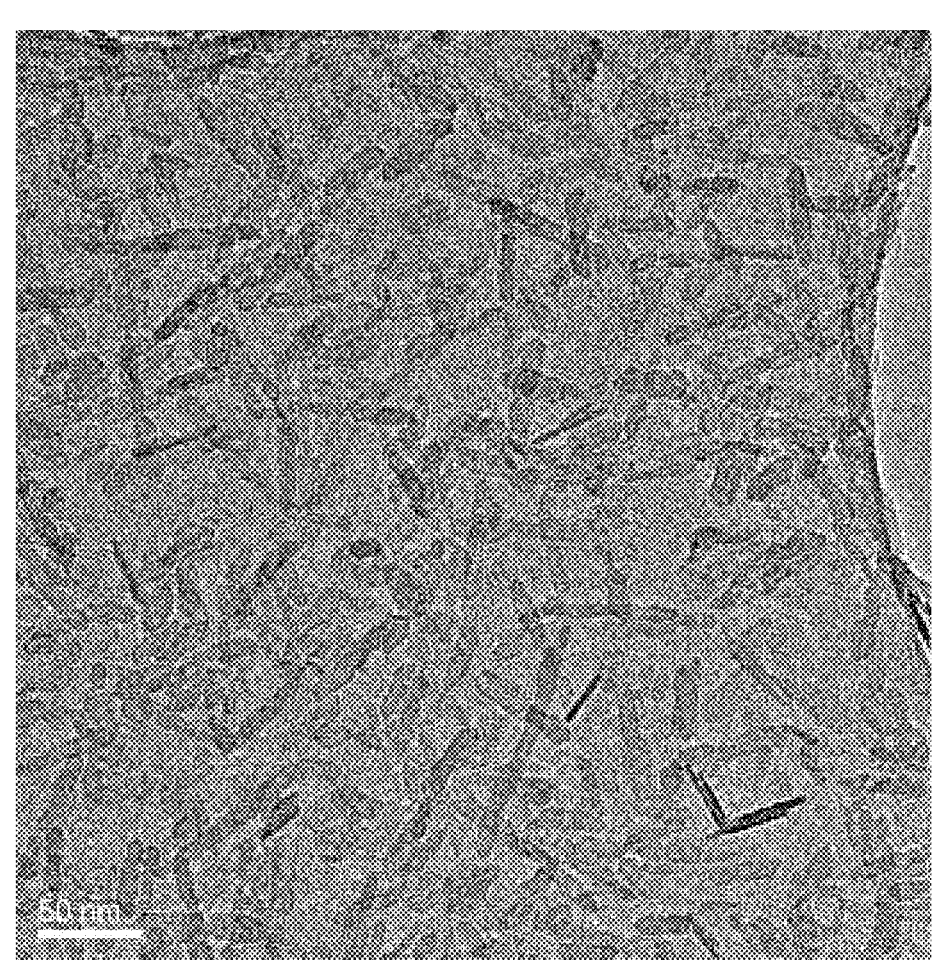
FIG. 2 is a transmission electron microscopic image of boehmite nanoparticles according to an exemplary embodiment of the present disclosure.

The transmission electron microscopic image of the produced boehmite nanoparticles is shown in FIG. 2.

Referring to FIG. 2, it was confirmed that rod-shaped boehmite nanoparticles having an average short axis diameter (a) of 5 nm and an average long axis length (b) of 50 nm may be produced.

In addition, it was confirmed that boehmite nanoparticles may be smoothly produced continuously for 30 hours.

Example 2

Boehmite nanoparticles were produced in the same manner as in Example 1, except that the mixture supplied to the reaction unit 30 was pressurized in the pressurization unit 33 and then heated by the heating unit 31.

The produced boehmite nanoparticles had a maximum diameter of 100 nm or less, when 100 particles in a transmission electron microscopic image were arbitrarily selected and measured, and had a mixed shape of particles having shapes close to a rod and a sphere.

In addition, it was confirmed that boehmite nanoparticles may be smoothly produced continuously for 30 hours.

Comparative Example 1

Boehmite nanoparticles were produced in the same manner as in Example 1, except that only water and aluminum iso-propoxide were added to the pretreatment unit without adding the lactic acid.

The produced boehmite nanoparticles had a shape close to a sphere not a rod, when 100 particles in a transmission electron microscopic image were arbitrarily selected and measured, and had an average diameter of 0.17 μm.

In Comparative Example 1, unlike Example 1, a differential pressure occurred by boehmite particles having a relatively large average diameter after 24 hours passed after production, so that raw material injection was impossible and continuous production was not allowed.

Comparative Example 2

Boehmite nanoparticles were produced in the same manner as in Example 1, except that only water and aluminum iso-propoxide were added to the pretreatment unit without adding lactic acid, and the mixture supplied to the reaction unit 30 was pressurized in the pressurization unit 33 and then heated by the heating unit 31.

The produced boehmite nanoparticles had very non-uniform size and shape, when 100 particles in a transmission electron microscopic image were arbitrarily selected and measured, and the average diameter of particles having a shape relatively close to a sphere was 0.3 μm.

In Comparative Example 2, unlike Example 1, a differential pressure occurred by boehmite particles having a relatively large average diameter after 24 hours passed after production, so that raw material injection was impossible and continuous production was not allowed.

In the method for producing boehmite nanoparticles according to the present disclosure, a mixture including an aluminum hydroxide and an organic acid is heated and pressurized to produce boehmite nanoparticles, so that continuous production of boehmite nanoparticles of 100 nm or less in a very uniform size is allowed.

In addition, the method for producing boehmite nanoparticles according to the present disclosure may easily adjust the size of the boehmite nanoparticles which is produced by adjusting the amount of an organic acid added, without interruption of the process.

Besides, the apparatus for producing boehmite according to the present disclosure may include a pretreatment unit to supply a mixture including an aluminum hydroxide having excellent reaction activity to the reaction unit, and thus, may have excellent productivity to the amount of raw material added.

In addition, the boehmite nanoparticles according to the present disclosure have a very uniform nano size to have high dispersibility, so that they are very likely to be used as a high-quality additive.

Hereinabove, although the present disclosure has been described by specific matters, limited exemplary embodiments, and drawings, they have been provided only for assisting the entire understanding of the present disclosure, and the present disclosure is not limited to the exemplary embodiments, and various modifications and changes may be made by those skilled in the art to which the present disclosure pertains from the description.

What is claimed is:

1. A method for producing boehmite, the method comprising:

(S0) reacting a raw material comprising an aluminum alkoxide and an organic acid to produce a mixture comprising an aluminum hydroxide and an organic acid;

(S1) supplying the mixture comprising the aluminum hydroxide and the organic acid to a reaction unit; and (S2) heating and pressurizing the mixture supplied to the reaction unit simultaneously or sequentially, wherein the organic acid comprised in the raw material of (S0) is the same as the organic acid comprised in the mixture of (S1), and wherein the method produces rod-shaped boehmite nanoparticles having an average-short axis diameter of 1 to 10 nm and an average long axis length of 30 to 100 nm.

2. The method for producing boehmite of claim 1, wherein (S2) comprises:

(S2-1) heating the mixture supplied to the reaction unit; and (S2-2) pressurizing the heated mixture.

3. The method for producing boehmite of claim 1, wherein in (S2), a temperature to which the mixture is heated is 80 to 200° C.

4. The method for producing boehmite of claim 1, wherein in (S2), a pressure to which the mixture is pressurized is 5 to 15 bar.

5. The method for producing boehmite of claim 1, wherein a liquid hour space velocity (LHSV) of the mixture is 0.01 to 5 h$^{-1}$.

6. The method for producing boehmite of claim 1, wherein in (S1), the organic acid is a (C2-C20) organic acid.

7. The method for producing boehmite of claim 1, wherein in (S0), water is added to the raw material to react the raw material, and (S0) comprises (S0-1) removing a reaction by-product comprising alcohol during the reaction of the raw material.

8. The method for producing boehmite of claim 7, wherein in (S0), the removing of the reaction by-product is performed by distillation.

9. The method for producing boehmite of claim 1, wherein in (S0), the aluminum alkoxide is represented by the following Chemical Formula 1:

$$Al(O\text{---}R)_3 \quad \text{[Chemical Formula 1]}$$

wherein R is (C1-C20) alkyl, (C2-C20) alkenyl, (C3-C20) cycloalkyl, (C6-C20) aryl, (C1-C20) alkylsilyl, (C7-C20) arylalkyl, or (C7-C20) alkylaryl.

10. The method for producing boehmite of claim 9, wherein in (S0), the aluminum alkoxide is aluminum iso-propoxide.

11. The method for producing boehmite of claim 1, wherein in (S0), the raw material has a mole ratio of the aluminum alkoxide: the organic acid of 1:0.001 to 1.

12. The method for producing boehmite of claim 1, wherein in (S1), the aluminum hydroxide is gelled.

13. The method for producing boehmite of claim 1, wherein the rod-shaped boehmite nanoparticles satisfy the following Relations 1 to 4:

$$50 \text{ nm} \leq D_{50} \leq 70 \text{ nm} \qquad \text{[Relation 1]}$$

$$0.70 \leq D_{20}/D_{50} \leq 0.98 \qquad \text{[Relation 2]}$$

$$1.02 \leq D_{70}/D_{50} \leq 1.3 \qquad \text{[Relation 3]}$$

$$D_{95} \leq 100 \text{ nm}$$

wherein $D_{50}$ in Relation 1 is a long axis length corresponding to 50% in a long axis length cumulative distribution of the rod-shaped boehmite nanoparticles, $D_{20}$ and $D_{50}$ in Relation 2 are long axis lengths corresponding to 20% and 50%, respectively, in the long axis length cumulative distribution of the rod-shaped boehmite nanoparticles, Dro and $D_{50}$ in Relation 3 are long axis lengths corresponding to 70% and 50%, respectively, in the long axis length cumulative distribution of the boehmite nanoparticles, and $D_{95}$ is a long axis length corresponding to 95% in the long axis length cumulative distribution of the boehmite nanoparticles.

14. The method for producing boehmite of claim 1, wherein the rod-shaped boehmite nanoparticles have an aspect ratio of 5:1 to 20:1.

* * * * *